US012494710B2

(12) United States Patent
Elshaer

(10) Patent No.: US 12,494,710 B2
(45) Date of Patent: Dec. 9, 2025

(54) SHARED ACTIVE ELECTROMAGNETIC INTERFERENCE FILTER FOR DUAL OPERATION OF HIGH VOLTAGE TO LOW VOLTAGE CONVERTER AND BIDIRECTIONAL AC/DC-DC/AC POWER CONVERTER

(71) Applicant: FORD GLOBAL TECHNOLOGIES, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 228 days.

(21) Appl. No.: 18/348,391

(22) Filed: Jul. 7, 2023

(65) Prior Publication Data

US 2025/0015714 A1  Jan. 9, 2025

(51) Int. Cl.
*H02M 3/335* (2006.01)
*B60L 53/20* (2019.01)
*H02M 1/44* (2007.01)
*H02M 7/219* (2006.01)
*H02M 7/538* (2007.01)

(52) U.S. Cl.
CPC ............... *H02M 1/44* (2013.01); *B60L 53/20* (2019.02); *H02M 3/33584* (2013.01); *H02M 7/219* (2013.01); *B60L 2210/10* (2013.01); *B60L 2210/30* (2013.01); *B60L 2210/40* (2013.01); *B60L 2220/40* (2013.01)

(58) Field of Classification Search
CPC ......... H02M 3/33576; H02M 3/33584; H02M 7/5387
See application file for complete search history.

(56) References Cited

U.S. PATENT DOCUMENTS

| | | | |
|---|---|---|---|
| 7,609,535 B2 | 10/2009 | Balakrishnan | |
| 11,021,069 B1* | 6/2021 | Elshaer | B60L 50/60 |
| 11,491,883 B2* | 11/2022 | Khaligh | H02M 7/797 |
| 2009/0103341 A1* | 4/2009 | Lee | B60W 10/26 320/140 |
| 2017/0028857 A1* | 2/2017 | Gonzales | H02J 1/082 |
| 2017/0282747 A1 | 10/2017 | Wang | |
| 2018/0194236 A1* | 7/2018 | Elshaer | B60L 53/12 |

(Continued)

FOREIGN PATENT DOCUMENTS

| | | |
|---|---|---|
| CN | 113765498 A | 12/2021 |
| EP | 3988377 A1 | 4/2022 |

*Primary Examiner* — Sisay G Tiku
(74) *Attorney, Agent, or Firm* — David B. Kelley; Brooks Kushman P.C.

(57) ABSTRACT

An automotive power system includes a circuit arrangement including an AC input, an AC/DC power converter, an electromagnetic interference filter connected between the AC input and AC/DC power converter, a transformer, a first switching bridge connected between the AC/DC power converter and transformer, and a switch bank connected with a secondary side of the transformer that connects the secondary side with a second switching bridge such that the second switching bridge is connected between a traction battery and the transformer, and the switching bridges and transformer form an isolated DC/DC power converter. The system also includes one or more switches that directly connect the traction battery between the AC input and electromagnetic interference filter.

15 Claims, 5 Drawing Sheets

(56) References Cited

U.S. PATENT DOCUMENTS

| | | | |
|---|---|---|---|
| 2018/0290545 A1* | 10/2018 | Elshaer | B60L 53/22 |
| 2019/0126763 A1* | 5/2019 | Najmabadi | B60L 53/24 |
| 2022/0297555 A1* | 9/2022 | Prasad | H02M 1/14 |
| 2022/0297557 A1* | 9/2022 | Prasad | H02M 3/1586 |
| 2022/0302835 A1* | 9/2022 | Prasad | H02M 3/158 |
| 2023/0048414 A1* | 2/2023 | Kinomura | B60L 53/16 |
| 2023/0202320 A1* | 6/2023 | Facanha De Oliveira | H02M 3/01 701/22 |
| 2023/0421042 A1* | 12/2023 | Zhu | H02M 3/33584 |
| 2024/0190276 A1* | 6/2024 | Absar | B60L 50/60 |
| 2025/0015714 A1* | 1/2025 | Elshaer | B60L 53/22 |
| 2025/0187448 A1* | 6/2025 | Elshaer | B60L 50/60 |
| 2025/0211017 A1* | 6/2025 | Elshaer | H02J 7/02 |

\* cited by examiner

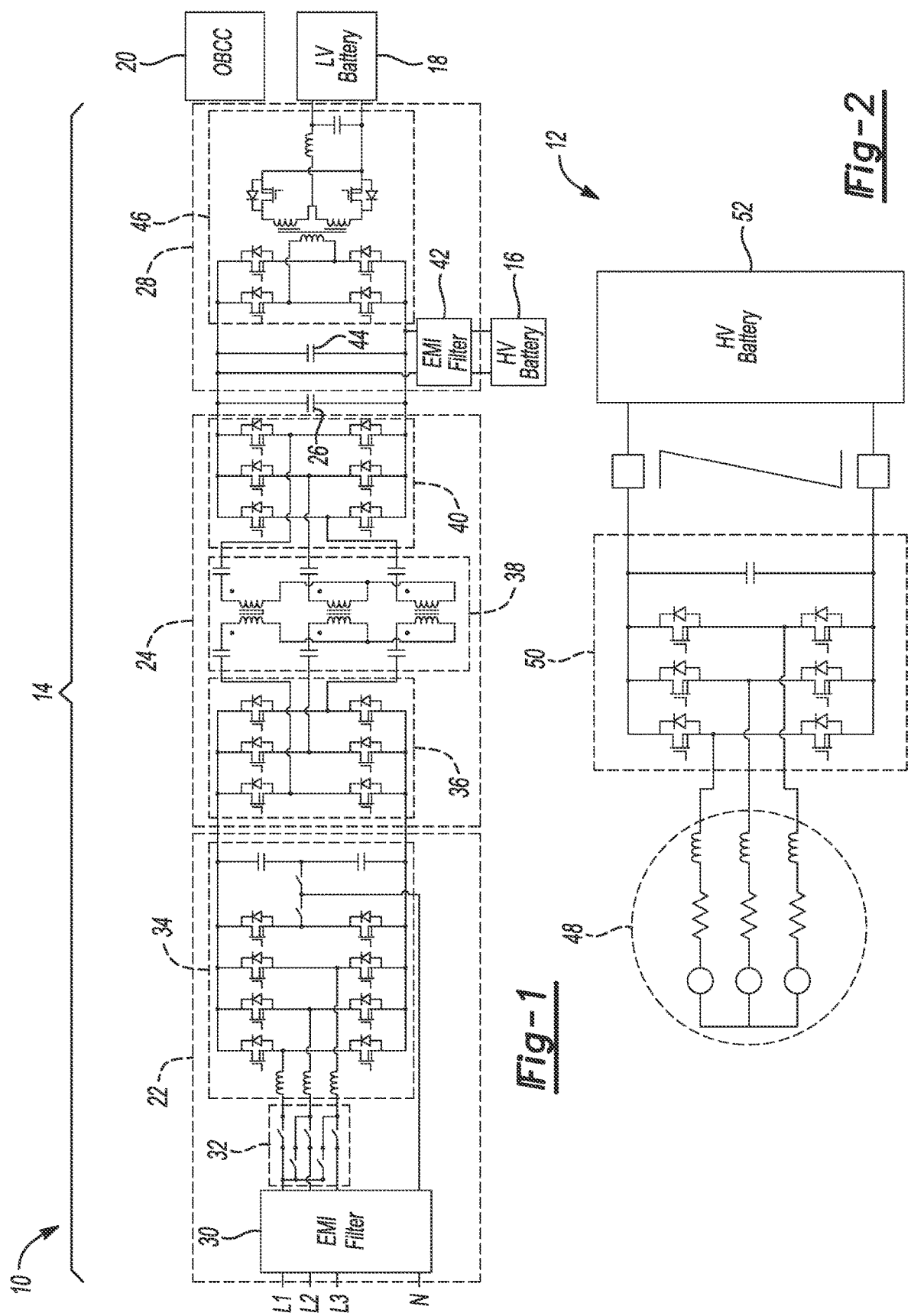

SHARED ACTIVE ELECTROMAGNETIC INTERFERENCE FILTER FOR DUAL OPERATION OF HIGH VOLTAGE TO LOW VOLTAGE CONVERTER AND BIDIRECTIONAL AC/DC-DC/AC POWER CONVERTER

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store the electrical energy.

SUMMARY

An automotive power system includes a traction battery, a first switching bridge, and a circuit arrangement. The circuit arrangement includes an AC input, an AC/DC power converter, an electromagnetic interference filter connected between the AC input and AC/DC power converter, a transformer, a second switching bridge connected between the AC/DC power converter and transformer, and a switch bank connected with a secondary side of the transformer that connects the secondary side with the first switching bridge such that the first switching bridge is connected between the traction battery and transformer, and the first switching bridge, transformer, and second switching bridge form an isolated DC/DC power converter. The system further includes one or more switches that directly connect the traction battery between the AC input and electromagnetic interference filter.

A method includes responsive to a request to charge a traction battery of a vehicle, closing first switches to connect a secondary side of a transformer, having a primary side connected with an AC/DC power converter through a switching bridge, between an electric machine and another switching bridge such that the transformer, electric machine, and switching bridges form an isolated DC/DC power converter that delivers charge power from the AC/DC power converter to the traction battery, and opening second switches to disconnect the traction battery from the AC/DC power converter and an AC input.

A vehicle includes an electric machine, a traction battery, a first switching bridge connected between the electric machine and traction battery, an AC input, an AC/DC power converter, an electromagnetic interference filter connected between the AC input and AC/DC power converter, a transformer, a second switching bridge connected between the AC/DC power converter and transformer, and a switch bank connected with a secondary side of the transformer. The switch bank connects the secondary side between the electric machine and first switching bridge such that the electric machine, first switching bridge, transformer, and second switching bridge form an isolated DC/DC power converter configured to deliver charge power from the AC/DC power converter to the traction battery. The vehicle also includes one or more switches that directly connect the traction battery between the AC input and electromagnetic interference filter.

BRIEF DESCRIPTION OF THE DRAWINGS

FIG. 1 is a schematic diagram of a system including a battery current control module.

FIG. 2 is a schematic diagram of a system including an inverter system controller.

DETAILED DESCRIPTION

Figure 3:
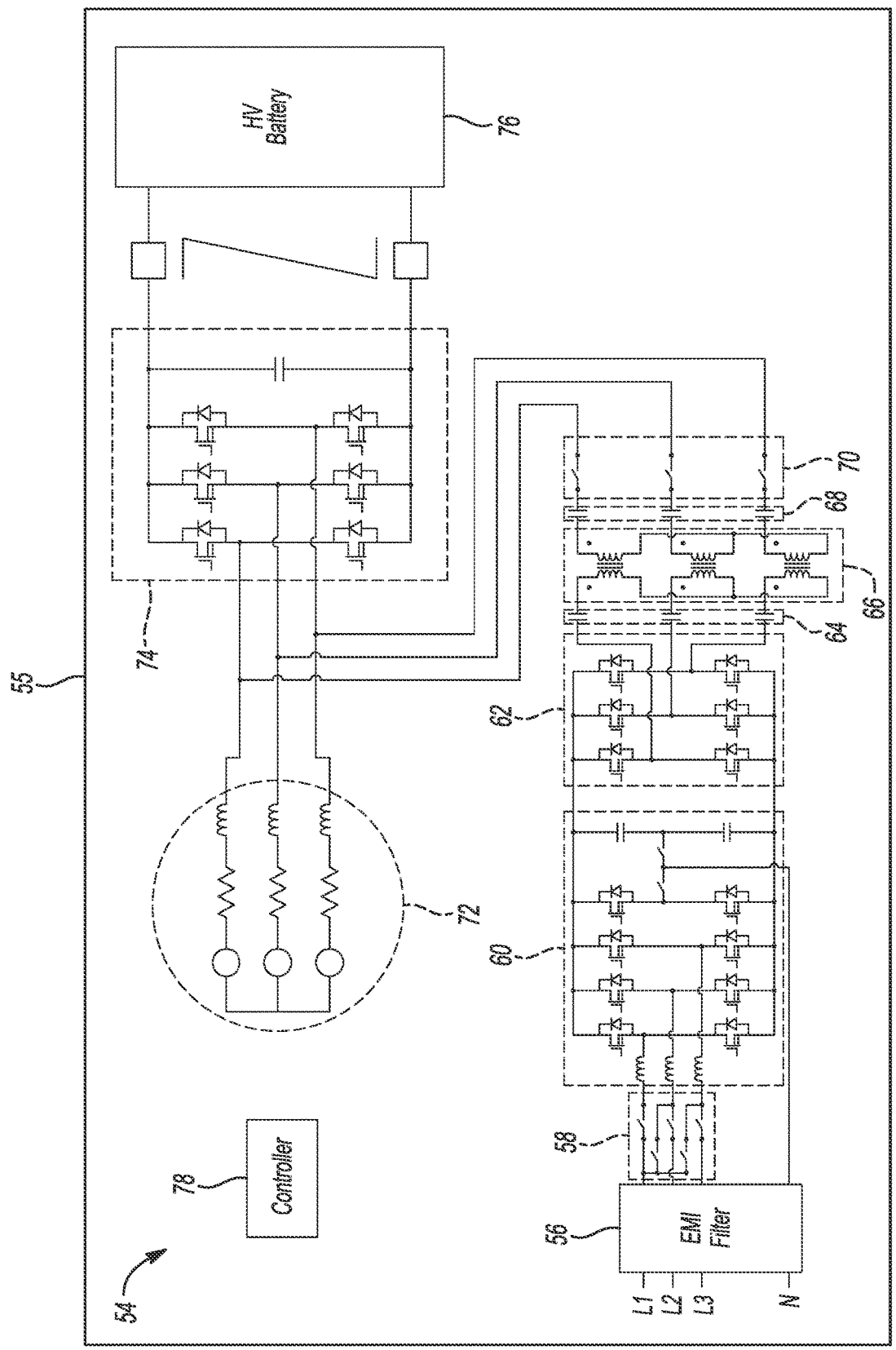
FIG. 3 is a schematic diagram of a system including an integrated battery current control module and inverter system controller.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery current control modules (BCCMs) are components in automotive vehicles, particularly those with electric or hybrid powertrains. These modules play a role in regulating and managing the flow of electric current to and from the battery.

BCCMs function as control units that interface between the battery, the charging system, and the electrical loads. They monitor and control various parameters such as battery state of charge, voltage, and temperature, and based on this information, they regulate the flow of current to the battery.

BCCMs may facilitate charging control by overseeing the charging process of the battery, and managing the voltage and current supplied by the charging system. By monitoring the battery's state of charge and adjusting the charging parameters accordingly, BCCMs attempt to ensure the battery receives the appropriate level of charge to maintain performance.

Similarly, BCCMs may be responsible for discharging control. They can regulate the current output from the battery to the electrical loads in the vehicle. By controlling the current flow, BCCMs may ensure a controlled supply of power to the various electrical components and systems.

BCCMs may also implement various measures for the battery. For instance, they may monitor battery temperature to prevent overheating. They may also detect overvoltage or undervoltage situations and implement measures to avoid short circuits or excessive current draw.

Communication interfaces are often incorporated into BCCMs. These interfaces, such as Controller Area Network (CAN) or LIN (Local Interconnect Network), allow BCCMs to exchange information with other vehicle systems, including the engine control unit (ECU) or the body control module (BCM). This enables coordinated operation and integrated control across various vehicle functions. BCCMs can receive commands or instructions from other control units and adjust current flow accordingly.

BCCMs may feature diagnostic capabilities. These modules can monitor the health and performance of the battery system. They can log codes and provide diagnostic information, facilitating maintenance.

Inverter system controllers (ISCs) are also components in automotive vehicles with electric powertrains. They play a role in managing and controlling the power flow between the battery and electric motor. A function of an inverter system controller is to convert direct current (DC) from the battery into alternating current (AC) to power the electric motor.

ISCs may act as a decision maker for the power electronics system. It may monitor various parameters such as motor speed, torque, and temperature to ensure operation.

A task of ISCs is to convert DC power from the battery into three-phase AC power suitable for the electric motor. It may utilize high-power semiconductor devices, for example insulated-gate bipolar transistors (IGBTs), to control the switching of current and voltage. By modulating the pulse width and frequency of the AC waveform, the inverter system controller regulates the speed and torque output of the electric motor.

ISCs may provide control over the electric motor. They may use algorithms and control strategies to regulate motor speed, torque, and direction of rotation. By adjusting the switching patterns of the IGBTs, the controller can vary the frequency and amplitude of the AC waveform, altering motor operation.

ISCs can facilitate regenerative braking. During deceleration or braking, the electric motor operates as a generator, converting the vehicle's kinetic energy into electrical energy. The inverter system controller may control the flow of energy, directing it back to the battery for storage.

ISCs may be responsible for managing the thermal conditions of the power electronics system. They may monitor the temperature of the inverter and electric motor, and employ cooling systems such as fans, liquid cooling, or heat sinks to dissipate excess heat and maintain operating temperatures.

ISCs may incorporate diagnostic capabilities to detect and protect against faults in the power electronics system. They may monitor various parameters such as voltage, current, and temperature values that could indicate a potential fault. If a fault is detected, the controller may take corrective actions such as shutting down the system, activating other measures, or providing fault codes for diagnostic purposes.

ISCs often feature communication interfaces such as CAN or Ethernet, enabling integration with other vehicle systems. They may exchange information with the main control unit, enabling coordinated operation and facilitating diagnostics and troubleshooting. Communication interfaces also allow the controller to receive commands or instructions from the electronic control unit (ECU) and adjust the power output accordingly.

ISCs may incorporate features such as overvoltage and undervoltage monitoring, overcurrent monitoring, and isolation monitoring.

Integrating the BCCM with the ISC is conventionally considered a challenge due to the disconnecting circuitry.

The schematics of typical separate systems 10, 12 are shown in FIGS. 1 and 2, respectively.

Referring to FIG. 1, the system 10 includes a BCCM 14, a traction battery 16, an auxiliary battery 18, and an onboard charge controller 20. The BCCM includes an AC/DC power factor correction circuit 22, an isolated high voltage DC/DC circuit 24, a link capacitor 26, and an isolated high voltage to low voltage DC/DC circuit 28. The isolated high voltage DC/DC circuit 24 is connected between the AC/DC power factor correction circuit 22 and link capacitor 26. The link capacitor 26 is connected between the isolated high voltage DC/DC circuit 24 and the isolated high voltage to low voltage DC/DC circuit 28. The traction battery 16 and auxiliary battery 18 are connected with the isolated high voltage to low voltage DC/DC circuit 28.

The AC/DC power factor correction circuit 22 includes an electromagnetic interference filter 30, a switch bank 32, and AC/DC power converter circuitry 34. The switch bank 32 is connected between the electromagnetic interference filter 30 and AC/DC power converter circuitry 34.

The isolated high voltage DC/DC circuit 24 includes a first switching bridge 36, a transformer 38, and a second switching bridge 40. The first switching bridge 36 is directly connected with the power converter circuitry 34. The transformer 38 is connected between the first and second switching bridges 36, 40.

The isolated high voltage to low voltage DC/DC circuit 28 includes an electromagnetic interference filter 42, a capacitor 44, and high voltage to low voltage power converter circuitry 46. The electromagnetic interference filter 42 is connected across the capacitor 44 and directly connected to the traction battery 16. The capacitor 44 is connected between the link capacitor 26 and high voltage to low voltage power converter circuitry 46. The high voltage to low voltage power converter circuitry 46 is directly connected to the auxiliary battery 18.

The onboard charge controller 20 is in communication with and/or exerts control over the components illustrated in FIG. 1.

Referring to FIG. 2, the system 12 includes an electric machine 48, an ISC 50, and a traction battery 52. The ISC 50 is connected between the electric machine 48 and traction battery 52.

The ISC 50 has a three-phase inverter designed to drive the electric machine 48 and operates at much higher power than the BCCM 14. The BCCM 14 also has three circuits configured as a three-phase inverter/rectifier. Two disconnect circuits are required to utilize the ISC's three-phase inverter in charging/discharging the traction battery 16. The first disconnect circuit is used to disconnect the electric motor 48 from the ISC 50, and the second disconnect is used to disconnect the ISC 50 from the traction battery 52. The contactors used in these disconnect circuits must carry the ISC's full current. Adding these contactors increases bill of material counts-making electric level integration unfavorable. Package level integration, however, can provide advantages since it reduces the overall package size and/or weight, and the number of connectors and wires. Here, a new circuit topology is proposed that addresses some of the disconnect circuitry's issues. The schematics of such a system 54 is shown in FIG. 3 within the context of vehicle 55.

Referring to FIG. 3, the system 54 includes an electromagnetic interference filter 56, a switch bank 58, an AC/DC power converter 60, a switching bridge 62, a capacitor bank 64, a transformer 66, a capacitor bank 68, a switch bank 70, an electric machine 72 a switching bridge 74, a traction battery 76, and a controller 78.

The switch bank 58 is connected between the electromagnetic interference filter 56 and AC/DC power converter 60. The switching bridge 62 is connected between the AC/DC power converter 60 and capacitor bank 64. The transformer 66 is connected between the capacitor banks 64, 68. The capacitor bank 68 is connected between the transformer and switch bank 70. The transformer 66 is thus also connected between the switching bridge 62 and switch bank 70.

The switching bridge 74 is connected between the electric machine 72 and traction battery 76.

The controller 78 is in communication with and/or exerts control over the components illustrated in FIG. 3.

The switch bank 70 is connected with a secondary side of the transformer 66: When switches of the switch bank 70 are closed, the transformer 66 is connected between the electric machine 72 and switching bridge 74 such that the switching bridge 62, transformer 66, electric machine 72, and switching bridge 74 form an isolated DC/DC power converter. The controller 78 may close the switches of the switch bank 70 responsive to a request to charge the traction battery 76. When closed energy received from, for example, a grid received at the electromagnetic interference filter 56 via L1, L2, L3, and N may be conditioned and transferred through the now formed isolated DC/DC power converter to the traction battery 76. The controller 78 may operate switches of the AC/DC power converter 60 and switching bridges 62, 64, for example, at 300 kHz when the switches of the switch bank 70 are closed (i.e., during charge mode.) When the charge is complete, the controller 78 may open the switches of the switch bank 70. The controller 78 may operate the switches of the switching bridge 64, for example, at 30 kHz (or less) when the switches of the switch bank 70 are open (e.g., during drive mode). Other switch speeds, of course, may be used.

The circuit topology presented in FIG. 3 allows for integrating a BCCM (the electromagnetic interference filter 56, switch bank 58, AC/DC power converter 60, switching bridge 62, capacitor bank 64, transformer 66, capacitor bank 68, and switch bank 70) with an ISC without using high current contractors. The add-on circuitry is interfaced directly with the ISC without disconnecting the electric machine or traction battery. The add-on circuitry includes a front-end AC/DC power factor correction circuit and portions of the isolated high voltage DC/DC circuit that is part of the BCCM. Three relays are added for disconnecting the add-on circuitry from the ISC during drive mode. The BCCM's high voltage DC/DC circuit can be designed considering the electric machine's stator winding impedance and its variations with respect to rotor position. When the vehicle is plugged into the AC grid, the add-on circuitry, ISC, and electric motor form a bi-directional AC/DC-DC/AC power converter. The BCCM's high voltage DC/DC power converter can be designed to switch at a frequency much higher than the ISC's switching frequency.

Figure 4:
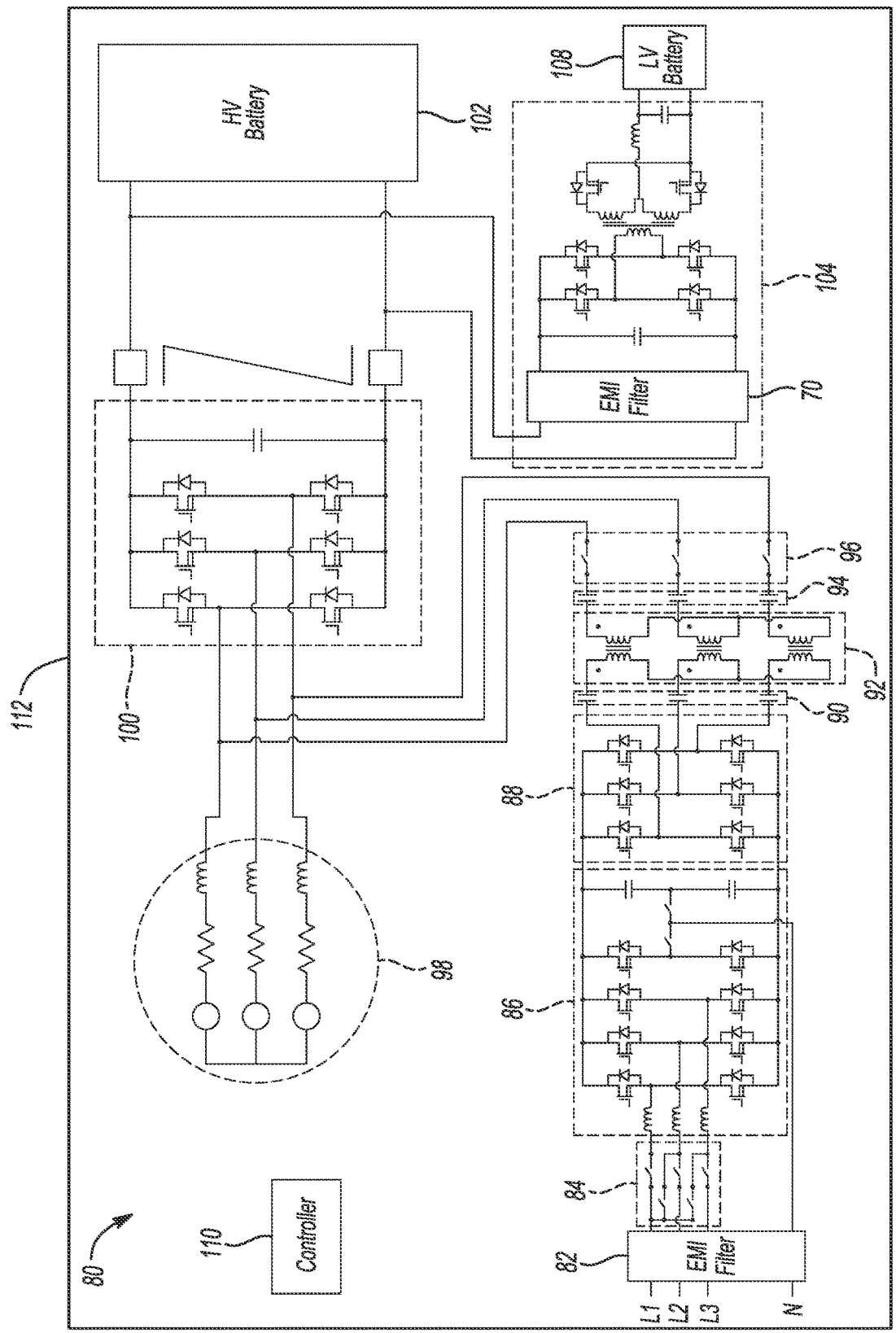
FIG. 4 is a schematic diagram of a system including an integrated battery current control module, inverter system controller, and high voltage to low voltage DC/DC converter.

Referring to FIG. 4, a system 80 includes an electromagnetic interference filter 82, a switch bank 84, an AC/DC power converter 86, a switching bridge 88, a capacitor bank 90, a transformer 92, a capacitor bank 94, a switch bank 96, an electric machine 98, a switching bridge 100, a traction battery 102, a high voltage to low voltage DC/DC power converter 104, an auxiliary battery 106, and a controller 110. These components are shown within the context of vehicle 112. The controller 110 is in communication with and/or exerts control over the components illustrated in FIG. 4.

The electromagnetic interference filter 82, switch bank 84, AC/DC power converter 86, switching bridge 88, capacitor bank 90, transformer 92, capacitor bank 94, switch bank 96, electric machine 98, switching bridge 100, and traction battery 102 are arranged, and can be operated by the controller 110, in a manner similar to FIG. 3.

The high voltage to low voltage DC/DC power convert 104 is connected between the switching bridge 100 and traction battery 102. It is further connected with the auxiliary battery 108 such that, when the high voltage to low voltage DC/DC power converter 104 is operating, power from the switching bridge 100 may flow through the high voltage to low voltage DC/DC power converter 104 to the auxiliary battery 108.

Integrating the BCCM (the electromagnetic interference filter 82, switch bank 84, AC/DC power converter 86, switching bridge 88, capacitor bank 90, transformer 92, capacitor bank 94, and switch bank 96) with the inverter system controller (the switch bank 100) is estimated to increase the ISC's package size by 50%. With a larger package size, the module's location may be constrained. Hence, there is a need to reduce packaging size.

The high voltage to low voltage DC/DC power converter 104 contributes to the required packaging space. In some arrangements, the high voltage circuit of the high voltage to low voltage DC/DC power converter 104 consumes almost half of its overall size. The following topology eliminates the high voltage circuit.

Figure 5:
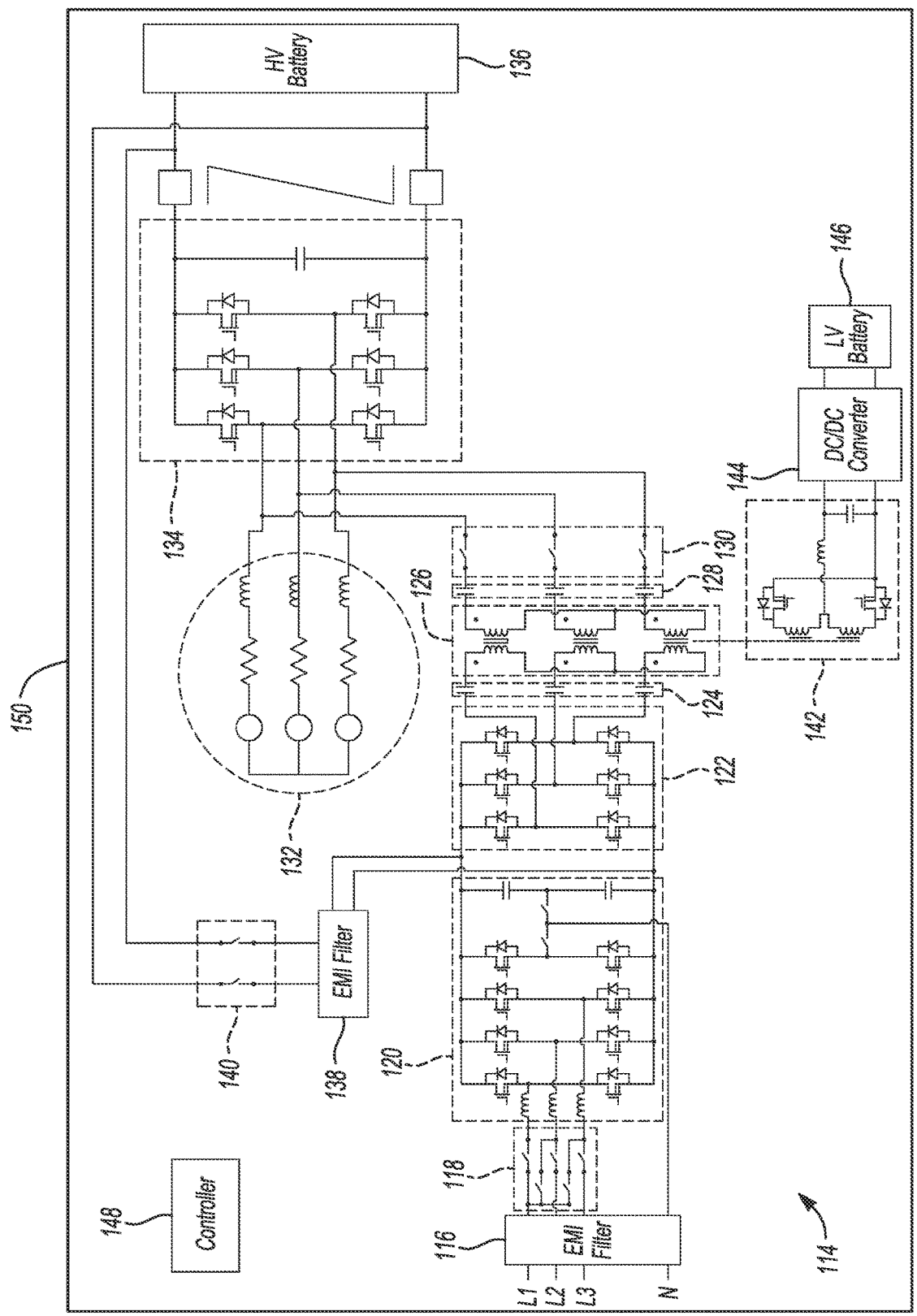
FIG. 5 is a schematic diagram of a system including an integrated battery current control module, inverter system controller, rectifier, and DC/DC converter.

Referring to FIG. 5, a system 114 includes an electromagnetic interference filter 116, a switch bank 118, an AC/DC power converter 120, a switching bridge 122, a capacitor bank 124, a transformer 126, a capacitor bank 128, a switch bank 130, an electric machine 132, a switching bridge 134, a traction battery 136, an electromagnetic interference filter 138, a switch bank 140, a rectifier 142, a DC/DC power converter, an auxiliary battery 146, and a controller 148. These components are shown within the context of vehicle 150.

The electromagnetic interference filter 116, switch bank 118, AC/DC power converter 120, switching bridge 122, capacitor bank 124, transformer 126, capacitor bank 128, switch bank 130, electric machine 132, switching bridge 134, and traction battery 136 are arranged in, and can be operated by the controller 148, in a manner similar to FIGS. 3 and 4. The components of FIG. 5 are thus in communication with and/or under the control of the controller 148.

The electromagnetic interference filter 138 is directly connected between the AC/DC power converter 120 and switch bank 122. The switch bank 140 is arranged to connect the electromagnetic interference filter 130 directly with the traction battery 136 such that power output from the AC/DC power converter 120 may flow directly to the traction battery 136 via the electromagnetic interference filter 138 and switch bank 140.

The rectifier 142 is magnetically coupled with the transformer 126 via a low voltage coil and common core. The DC/DC power converter 144 is connected between the rectifier 142 and auxiliary battery 146 such that power from the transformer 142 may flow through the rectifier 142 and DC/DC power converter 144 to the auxiliary battery 146. The DC/DC power converter 144 may provide additional power regulation to the auxiliary battery 146.

The rectifier 142 may be implemented as a center-tap rectifier, a full-bridge rectifier, a half-bridge rectifier, a current doubler, etc. The low voltage coil can be implemented as a center-tap coil or single coil. The rectifier 142 rectifies the voltage induced across the low voltage coil for delivering DC power to the auxiliary battery 146.

As alluded to above, the switch bank 140 electrically connects the traction battery 136 to the BCCM's intermediate DC bus. When the vehicle 150 is disconnected from the AC grid or is in drive mode, all other relays, including the switch bank 130, are open. The BCCM's intermediate DC bus is energized by closing the switch bank 140. An isolated high voltage to low voltage DC/DC power converter is configured for charging the auxiliary battery 146. The transformer's primary windings and low voltage coil are energized for charging/discharging the auxiliary battery 146.

When the vehicle 150 is connected to the AC grid, the controller 148 generates commands such that the switch bank 140 is open, and the switch bank 130 is closed. The switch bank 118 is configured depending on grid type (e.g., single-phase, two-phase, three-phase, etc.). All transformer windings are energized to allow for bidirectional power flow between the AC grid and the traction battery 136, and between the traction battery 136 and auxiliary battery 146.

While the above topology is estimated to reduce the DC/DC circuit's size by almost half, it still requires adding a high voltage electromagnetic interference filter between the high voltage battery and the BCCM's intermediate DC bus. Such a high voltage electromagnetic interference filter required for a high voltage to low voltage DC/DC converter may consume roughly one quarter of its board space. Moreover, an AC side electromagnetic interference filter used in a BCCM's AC/DC circuit may consumes one third of the overall converter space.

Below, an arrangement is proposed that eliminates the electromagnetic interference filter needed between the high voltage battery and intermediate DC bus thereby reducing the BCCM's AC side electromagnetic filter by at least one third. To accomplish this, the proposed topology interfaces the high voltage battery to the AC side electromagnetic interference filter input between a line and neutral, resulting in a shared active electromagnetic interference filter for dual-mode operation.

Figure 6:
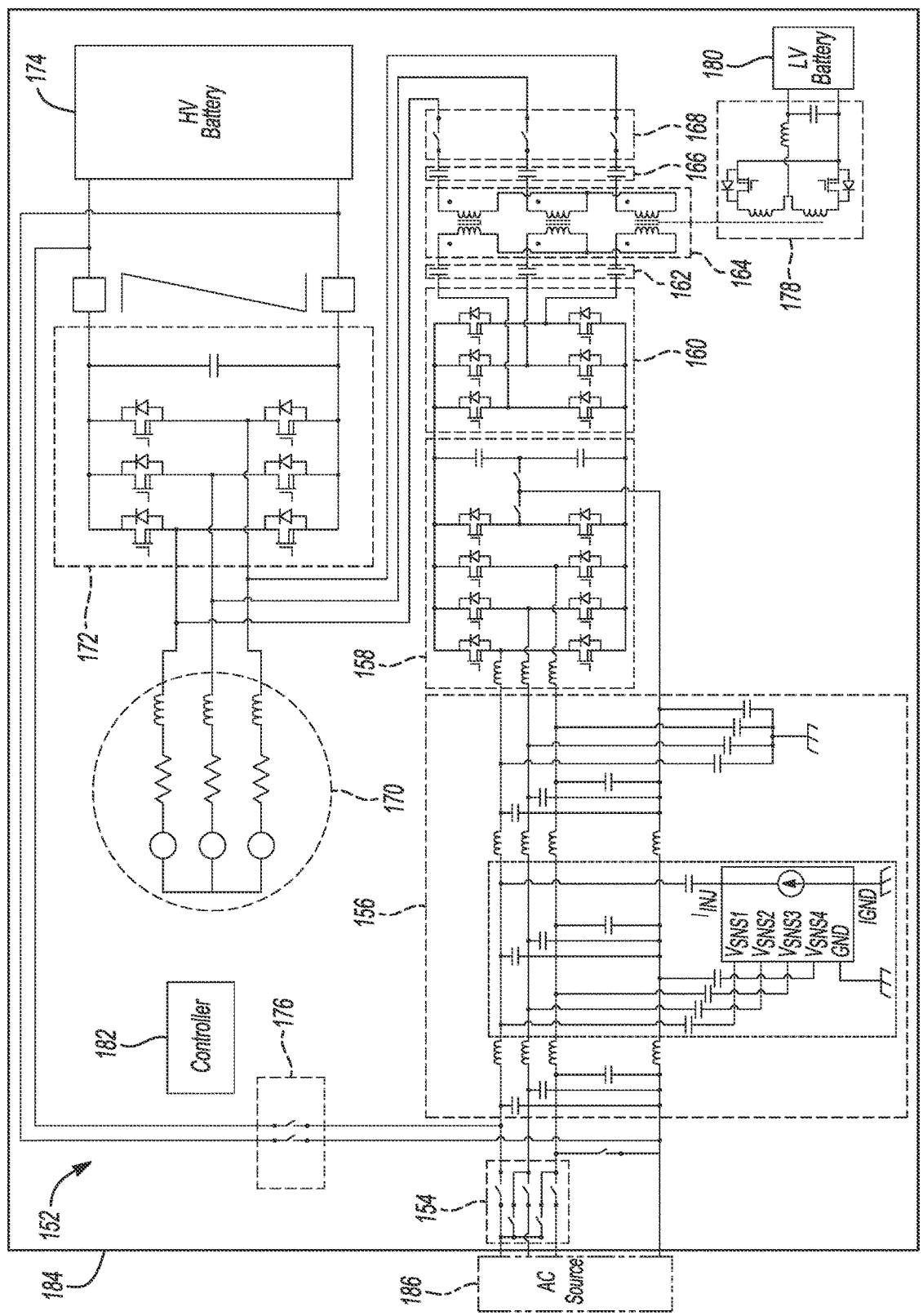
FIG. 6 is a schematic diagram of a system with a shared active electromagnetic interference filter for dual-mode operation.

Referring to FIG. 6, a system 152 includes a switch bank 154, an electromagnetic interference filter circuitry 156, an AC/DC power converter 158, a switching bridge 160, a capacitor bank 162, a transformer 164, a capacitor bank 166, a switch bank 168, an electric machine 170, a switching bridge 172, a traction battery 174, a switch bank 176, a rectifier 178, an auxiliary battery 180, and a controller 182. These components are shown within the context of vehicle 184.

The electromagnetic interference filter circuitry 156 is connected between the switch bank 154 and AC/DC power converter 158. As apparent to those of ordinary skill, the electromagnetic interference filter circuitry 156 includes active noise cancellation circuitry that senses line voltages through decoupling capacitors, and injects current to cancel common mode currents generated by the switching bridges 162, 174.

The AC/DC power converter 158, switching bridge 160, capacitor bank 162, transformer 164, capacitor bank 166, switch bank 168, electric machine 170, switching bridge 172, and traction battery 174, rectifier 178, and auxiliary batter 180 are arranged in, and can be operated by the controller 182, in a manner similar to FIG. 5 (and FIGS. 3 and 4 to the extent the topologies are similar). The components of FIG. 6 are thus in communication with and/or under the control of the controller 182.

The switch bank 176 is arranged to connect the traction battery 174 directly between the switch bank 154 and electromagnetic interference filter 156 such that power from an AC source 186 connected with the switch bank 154 may flow directly to the traction battery 174.

While the vehicle 184 is disconnected from the AC source 186 or in drive mode, switches of the switch bank 154 are closed first to connect the three lines in parallel. Then, switches of the switch bank 140 are closed to connect the traction battery 174 between line 1 of the lines and neutral. Power delivered to the integrated high voltage to low voltage DC/DC converter flows through the AC side electromagnetic filter circuitry 156. The filter's passive component size is reduced by adding an add-on switching circuit: Four high-voltage-rated buffers with high bandwidth control and sensing circuitry are added to measure the high-frequency component of the line voltage; the low-frequency component of the AC line voltage is decoupled by the four capacitors between the voltage sense circuitry and the filter board; and one current compensation circuit injects counteracting common-mode (CM) currents through a coupling capacitor to one of the phase lines.

The AC/DC power factor correction is utilized for energizing the circuit connected to the BCCM's intermediate DC bus. The following actions are taken to enable DC current to pass from the traction battery 174 to the intermediate DC bus. The top side high-frequency field-effect transistors (e.g., MOSFETs) of the AC/DC power converter 158 are turned ON (not switching). The bottom side low-frequency field-effect transistors of the AC/DC power converter 158 are turned ON (not switching). The switch directly adjacent to the top and bottom side field-effect transistors is closed.

The BCCM's intermediate DC bus is an input to the integrated high voltage to low voltage DC/DC converter. Switches of the switch bank 168 are opened to disconnect the BCCM's secondary windings from the switching bridge 172. No current flows through the transformer's secondary windings. Voltage coupled to the low voltage coil is rectified by the rectifier 178 for charging the auxiliary battery 180.

While the vehicle 184 is connected to the AC source 186, switches of the switch bank 176 are opened to disconnect the traction battery 174 from the BCCM's AC circuit. Switches of the switch bank 168 are closed to connect the BCCM's circuit to the switching bridge 172. The field-effect transistors of the switching bridge 172 rectify the voltage induced across the transformer's secondary windings for charging the traction battery 174. The low voltage coil is magnetically coupled to the transformer 164 and is energized to deliver power to the auxiliary battery 180. The AC side electromagnetic filter circuitry 156 is utilized the same way as described when the vehicle 184 is disconnected from the AC source 186 or in drive mode.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The capacitor banks 124, 128 could instead be inductor banks, or capacitor and inductor banks. The symbols used to represent capacitors of the capacitor banks 124, 128 can thus also represent inductors of such inductor banks, or represent capacitors and inductors of such capacitor and inductor banks. The switching bridges 122, 134 may be n-phase inverters or n-phase rectifiers depending on topology and functionality requirements, etc. The switching bridge 122, for example, may be configured as a single phase inverter by removing one of its phase legs.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
   a traction battery;
   a first switching bridge;
   a circuit arrangement including an AC input, an AC/DC power converter, an electromagnetic interference filter connected between the AC input and AC/DC power converter, a transformer, a second switching bridge connected between the AC/DC power converter and transformer, and a switch bank connected with a secondary side of the transformer and configured to connect the secondary side with the first switching bridge such that the first switching bridge is connected between the traction battery and transformer, and the first switching bridge, transformer, and second switching bridge form an isolated DC/DC power converter;
   one or more switches configured to directly connect the traction battery between the AC input and electromagnetic interference filter;
   a network of switches connected between the AC input and the electromagnetic interference filter; and
   a controller programmed to, responsive to disconnection of the AC input from an AC source, sequentially open switches of the switch bank, close the network of switches, and close the one or more switches.

2. The automotive power system of claim 1, wherein the electromagnetic interference filter includes active noise cancellation circuitry.

3. The automotive power system of claim 2, wherein the active noise cancellation circuitry is configured to sense line voltages through decoupling capacitors, and inject current to cancel common mode currents generated by the first and second switching bridges.

4. The automotive power system of claim 1, wherein the first switching bridge is an n-phase inverter or an n-phase rectifier.

5. The automotive power system of claim 1, wherein the second switching bridge is an n-phase inverter or an n-phase rectifier.

6. An automotive power system comprising:
   a traction battery;
   a first switching bridge;
   a circuit arrangement including an AC input, an AC/DC power converter, an electromagnetic interference filter connected between the AC input and AC/DC power converter, a transformer, a second switching bridge connected between the AC/DC power converter and transformer, and a switch bank connected with a secondary side of the transformer and configured to connect the secondary side with the first switching bridge such that the first switching bridge is connected between the traction battery and transformer, and the first switching bridge, transformer, and second switching bridge form an isolated DC/DC power converter;
   one or more switches configured to directly connect the traction battery between the AC input and electromagnetic interference filter; and
   a network of switches connected between the AC input and the electromagnetic interference filter, wherein during drive, switches of the switch bank are open, and the network of switches and the one or more switches are closed.

7. The automotive power system of claim 6, wherein the electromagnetic interference filter includes active noise cancellation circuitry.

8. The automotive power system of claim 7, wherein the active noise cancellation circuitry is configured to sense line voltages through decoupling capacitors, and inject current to cancel common mode currents generated by the first and second switching bridges.

9. The automotive power system of claim 6, wherein the first switching bridge is an n-phase inverter or an n-phase rectifier.

10. The automotive power system of claim 6, wherein the second switching bridge is an n-phase inverter or an n-phase rectifier.

11. An automotive power system comprising:
    a traction battery;
    a first switching bridge;
    a circuit arrangement including an AC input, an AC/DC power converter, an electromagnetic interference filter connected between the AC input and AC/DC power converter, a transformer, a second switching bridge connected between the AC/DC power converter and transformer, and a switch bank connected with a secondary side of the transformer and configured to connect the secondary side with the first switching bridge such that the first switching bridge is connected between the traction battery and transformer, and the first switching bridge, transformer, and second switching bridge form an isolated DC/DC power converter;
    one or more switches configured to directly connect the traction battery between the AC input and electromagnetic interference filter; and a network of switches connected between the AC input and the electromagnetic interference filter, wherein during charge, switches of the switch bank are closed, and the network of switches and the one or more switches are open.

12. The automotive power system of claim 11, wherein the electromagnetic interference filter includes active noise cancellation circuitry.

13. The automotive power system of claim 12, wherein the active noise cancellation circuitry is configured to sense line voltages through decoupling capacitors, and inject current to cancel common mode currents generated by the first and second switching bridges.

14. The automotive power system of claim 11, wherein the first switching bridge is an n-phase inverter or an n-phase rectifier.

15. The automotive power system of claim 11, wherein the second switching bridge is an n-phase inverter or an n-phase rectifier.

* * * * *